(12) United States Patent
Ganesh et al.

(10) Patent No.: US 8,464,104 B2
(45) Date of Patent: Jun. 11, 2013

(54) MOBILITY OF VERSIONED WORKLOAD PARTITIONS

(75) Inventors: Perinkulam I. Ganesh, Round Rock, TX (US); John M. McConaughy, Austin, TX (US); Kavitha Ramalingam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/879,812

(22) Filed: Sep. 10, 2010

(65) Prior Publication Data

US 2012/0066555 A1    Mar. 15, 2012

(51) Int. Cl.
*G06F 11/00*    (2006.01)

(52) U.S. Cl.
USPC .......................................................... 714/49

(58) Field of Classification Search
USPC .......................................................... 714/49
See application file for complete search history.

(56) References Cited

U.S. PATENT DOCUMENTS

| | | | |
|---|---|---|---|
| 6,385,552 B1 * | 5/2002 | Snyder ........................... | 702/123 |
| 6,542,841 B1 * | 4/2003 | Snyder ........................... | 702/104 |
| 7,290,166 B2 * | 10/2007 | Rothman et al. .............. | 714/6.11 |
| 7,536,690 B2 | 5/2009 | Alverson et al. | |
| 7,549,045 B2 | 6/2009 | Massarenti et al. | |
| 7,552,426 B2 | 6/2009 | Traut | |
| 7,571,448 B1 | 8/2009 | Sallam | |
| 7,574,709 B2 | 8/2009 | Erlingsson et al. | |
| 7,590,863 B2 | 9/2009 | Lambert | |
| 7,624,248 B1 | 11/2009 | Wentzlaff et al. | |
| 7,673,052 B2 * | 3/2010 | Fried et al. .................... | 709/226 |
| 7,673,304 B2 | 3/2010 | Gosalia et al. | |
| 7,702,843 B1 | 4/2010 | Chen et al. | |
| 7,716,407 B2 | 5/2010 | Almasi et al. | |
| 7,716,446 B1 | 5/2010 | Chen et al. | |
| 7,734,894 B1 | 6/2010 | Wentzlaff et al. | |
| 7,734,895 B1 | 6/2010 | Agarwal et al. | |
| 7,739,316 B2 | 6/2010 | Thompson et al. | |
| 8,200,771 B2 * | 6/2012 | Ganesh et al. ................ | 709/212 |
| 8,260,925 B2 * | 9/2012 | Chen et al. .................... | 709/226 |
| 2008/0215796 A1 | 9/2008 | Lam et al. | |
| 2008/0320269 A1 * | 12/2008 | Houlihan et al. ............. | 711/203 |
| 2009/0007106 A1 * | 1/2009 | Araujo et al. ..................... | 718/1 |
| 2009/0157882 A1 * | 6/2009 | Kashyap ....................... | 709/227 |
| 2009/0254572 A1 | 10/2009 | Redlich et al. | |
| 2010/0094948 A1 * | 4/2010 | Ganesh et al. ................ | 709/212 |
| 2010/0122124 A1 * | 5/2010 | Chen et al. ...................... | 714/57 |

(Continued)

OTHER PUBLICATIONS

IBM, "IBM 32-bit SDK for AIX platforms", *Java Technology Edition, SDK Guide* http://www.ibm.com/developerworks/java/jdk/aix/j532/sdkguide.aix32.html#jretools (Date Obtained from the Internet Jul. 19, 2010). 2009 , 37 pages.

(Continued)

*Primary Examiner* — Kamini Patel
(74) *Attorney, Agent, or Firm* — DeLizio Gilliam, PLLC

(57) ABSTRACT

A versioned workload partition (WPAR) can be migrated from a source machine to a destination machine. Each thread associated with a process executing within the versioned WPAR is frozen. For each thread associated with the process, an error number associated with the thread is received in response to freezing execution of the thread and at least a current state of the thread is determined as checkpoint information associated with the thread based, at least in part, on the error number associated with the thread. The checkpoint information associated with the one or more threads is provided to the destination machine. The checkpoint information is used at the destination machine to reconstruct the process within a destination versioned WPAR on the destination machine.

20 Claims, 6 Drawing Sheets

U.S. PATENT DOCUMENTS

| | | | |
|---|---|---|---|
| 2010/0210240 A1* | 8/2010 | Mahaffey et al. | 455/411 |
| 2011/0099403 A1* | 4/2011 | Miyata et al. | 713/323 |
| 2012/0011519 A1* | 1/2012 | Ganesh | 718/105 |
| 2012/0054770 A1* | 3/2012 | Krishnamurthy et al. | 718/105 |
| 2012/0054771 A1* | 3/2012 | Krishnamurthy et al. | 718/105 |
| 2012/0066389 A1* | 3/2012 | Hegde et al. | 709/226 |

OTHER PUBLICATIONS

IBM, "IBM Workload Partitions Manager for AIX", *AIX Version 6.1* http://www.filibeto.org/unix/aix/lib/re1/6.1/wparlpp.pdf (Date Obtained from the Internet Jul. 19, 2010). Nov. 2007, 66 pages.

* cited by examiner

MOBILITY OF VERSIONED WORKLOAD PARTITIONS

BACKGROUND

Embodiments of the inventive subject matter generally relate to the field of memory management and, more particularly, to mobility of versioned workload partitions.

Workload partition (WPAR) mobility involves planned migration of WPAR workloads (e.g., data, applications, processes, etc. executing within the WPAR) from one hardware resource (e.g., a source server) to another hardware resource (e.g., a destination server) without disrupting services provided by the WPAR to be migrated. The WPAR may be migrated to ensure seamless operation of the WPAR for balancing workloads between servers. The WPAR may also be migrated in the event that the source server will be shut down for servicing (e.g., upgrades, repairs, installations, etc.).

SUMMARY

Various embodiments for mobility of versioned workload partitions are disclosed. In one embodiment, it is determined at a source machine associated with a global operating system, that a workload partition associated with a first version of an operating system is to be migrated from the source machine to a destination machine. The first version of the operating system is an earlier version than the global operating system. Execution of one or more threads associated with a process executing within the workload partition to be migrated from the source machine to the destination machine is halted. For each of the one or more threads associated with the process executing within the workload partition, an error number associated with the thread is received in response to halting the execution of the thread. For each of the one or more threads associated with the process executing within the workload partition, a current state of the thread is determined as checkpoint information associated with the thread based, at least in part, on the error number associated with the thread. The checkpoint information associated with each of the one or more threads associated with the process executing within the workload partition is provided to the destination machine to migrate the workload partition from the source machine to the destination machine.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
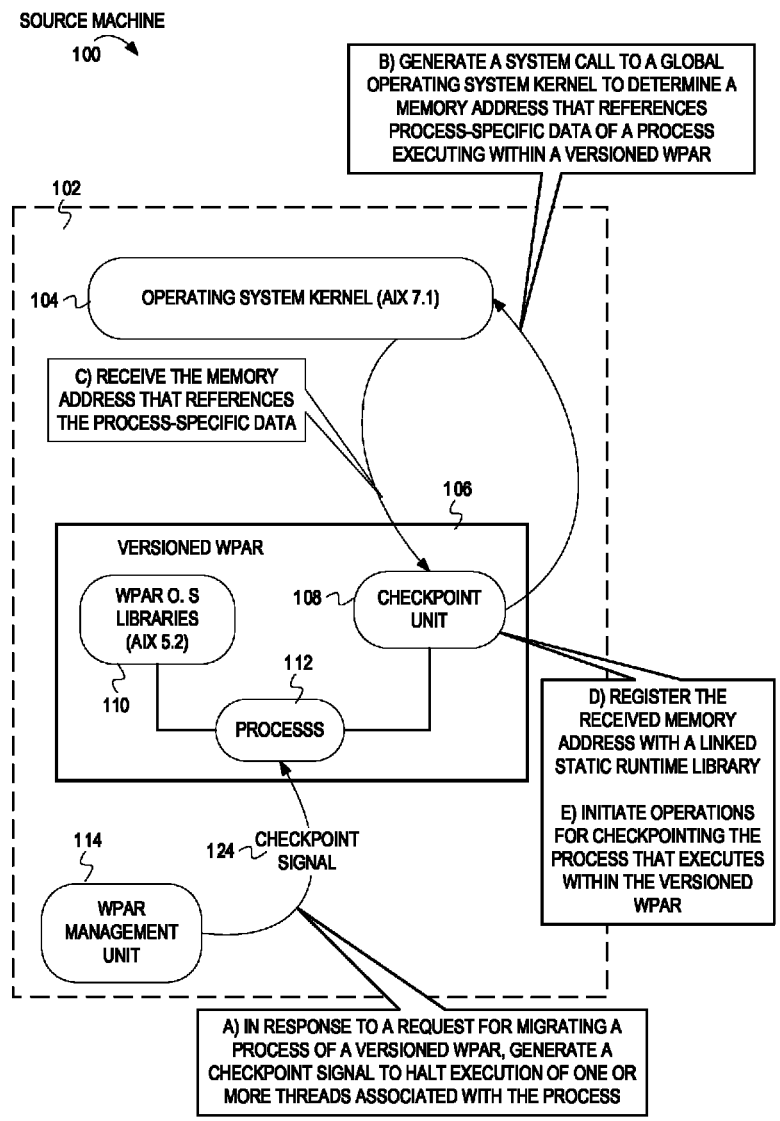
FIG. 1 depicts an example conceptual diagram illustrating example operations for determining a memory address that references process-specific data associated with a process in a versioned workload partition (WPAR).

The description that follows includes exemplary systems, methods, techniques, instruction sequences, and computer program products that embody techniques of the present inventive subject matter. However, it is understood that the described embodiments may be practiced without these specific details. For instance, although examples refer to migrating a versioned workload partition (WPAR) from a source physical machine to a destination physical machine, embodiments are not so limited. In other embodiments, the versioned WPAR can be migrated from a source LPAR on a source machine to a destination LPAR on a destination machine, from a source logical partition (LPAR) to a destination LPAR on the same physical machine, etc. Additionally, although examples refer to migrating WPARs in an IBM® Advanced Interactive Executive® (AIX) operating system, in other embodiments, operations described herein can also be implemented in other suitable operating systems and/or across other implementations of operating system-level virtualization (e.g., across containers/zones, virtual environments, virtual partitions, virtual machines, virtual private servers (VPS), etc.). In other instances, well-known instruction instances, protocols, structures, and techniques have not been shown in detail in order not to obfuscate the description.

Organizations employ operating system virtualization or workload partitions (WPARs), also known as virtual operating systems or virtualized operating systems, to organize and to isolate workloads in accordance with business requirements, organizational guidelines, etc., while efficiently utilizing available equipment. For instance, an administrator can create different WPARs for a marketing department database and associated applications ("marketing database workload"), an accounting department database and associated applications ("accounting database workload"), and a legal department electronic mail server ("legal e-mail workload"). Instead of using three different servers, the resources of a single physical server can be used to satisfy the needs of the three workloads. Each WPAR presents to the respective hosted workload (i.e., processes, application(s) of the workload) as an instance of an operating system with its own namespace and process environment. The WPARs are isolated by ensuring that no WPARs access the same memory space or manage the same resource, thus precluding the need for running three different servers. Versioned WPARs (also known as compatibility runtime environment (CRE) WPARs) support an earlier version (e.g., version 5.2 of an IBM AIX operating system) of operating system libraries, scripts, and other content that execute on a later version of the operating system (e.g., a 7.1 version of the IBM AIX operating system) of a source machine that hosts the versioned WPAR.

Existing techniques for WPAR mobility can be implemented when the WPAR to be migrated, the source machine that hosts the WPAR, and the destination machine where the WPAR will be migrated are associated with a common version of the operating system. Migrating the WPAR from the source machine to the destination machine typically involves recording a snapshot of (also known as checkpointing) a current state of the WPAR (including applications, processes, workloads, data, etc.) on the source machine and using the recorded snapshot (or checkpoint information) to recreate the WPAR and to resume operation of the WPAR on the destination machine. However, interoperability issues can arise in migrating a versioned WPAR that supports an earlier version of an operating system to a destination machine that supports a later version of the operating system. For example, a checkpoint program that checkpoints processes executing in the versioned WPAR may be statically linked to the later version of the operating system, and therefore the checkpoint program may not be configured to checkpoint processes compiled on and linked to the earlier version of the operating system supported by the versioned WPAR. This is because libraries, process architecture, etc. can vary from one version of the operating system to another. For example, process-specific data (e.g., location of error numbers or errno) may be stored at a first memory offset in version 5.2 of the AIX operating system, while the process-specific data may be stored at a second memory offset in version 7.1 of the AIX operating system. Thus, the checkpoint program compiled on the later version of the operating system may be configured to access data at a particular memory location. However, if the checkpoint program is executed on the earlier version of the operating system, the checkpoint program might be unable to access the appropriate memory location or might access an incorrect memory location to retrieve the data, resulting in incompatibility, erroneous symbol resolution, etc. It might be impractical and cost prohibitive to maintain different versions of the checkpoint program (e.g., a checkpoint program compiled on and linked to different earlier versions of the operating system) and to load a different version of the checkpoint program depending on the version of the operating system supported by the versioned WPAR.

A modified checkpoint program can be implemented to checkpoint processes irrespective of the version of the operating system to which the processes are linked. In other words, the checkpoint program can be configured to be independent of the version of the operating system to which the process being checkpointed is linked. Prior to checkpointing the process, the checkpoint program can issue a system call to a kernel of the base or global operating system of the source machine (i.e., the later version of the operating system associated with the source machine that implements the versioned WPAR) to determine a memory address that references process-specific data associated with the process to be checkpointed. The received memory address can vary depending on the process and depending on the version of the operating system associated with the versioned WPAR within which the process executes. The memory address can enable the checkpoint program to correctly access and identify requisite process-specific data associated with the process that is compiled on and is linked to the earlier version of the operating system. To checkpoint and consequently to migrate the process, an interrupt can be issued to halt execution of the process. The kernel of the global operating system can also be configured to issue an error if execution of a system call generated by the process was interrupted. The checkpoint program can analyze the errors, identify system calls that were interrupted, and store checkpoint information that represents a current state of the process. On the destination machine, a skeleton process of the process to be migrated can be populated with the checkpoint information to recreate the process on the destination machine. The recreated process can be started on the destination machine so that execution of the recreated process resumes from the point at which it was interrupted on the source machine. Additionally, any system calls that were interrupted/aborted on the source machine, because of the checkpoint operations, can be reissued to an operating system kernel of the destination machine. Such a version-independent checkpoint program enables processes of a versioned WPAR to be checkpointed irrespective of the version of the operating system associated with the versioned WPAR. By using such a version-independent checkpoint program, efficiency associated with migrating the versioned WPAR from the source machine to the destination machine can be improved and maintenance associated with migrating the versioned WPAR with can be minimized.

Figure 2:
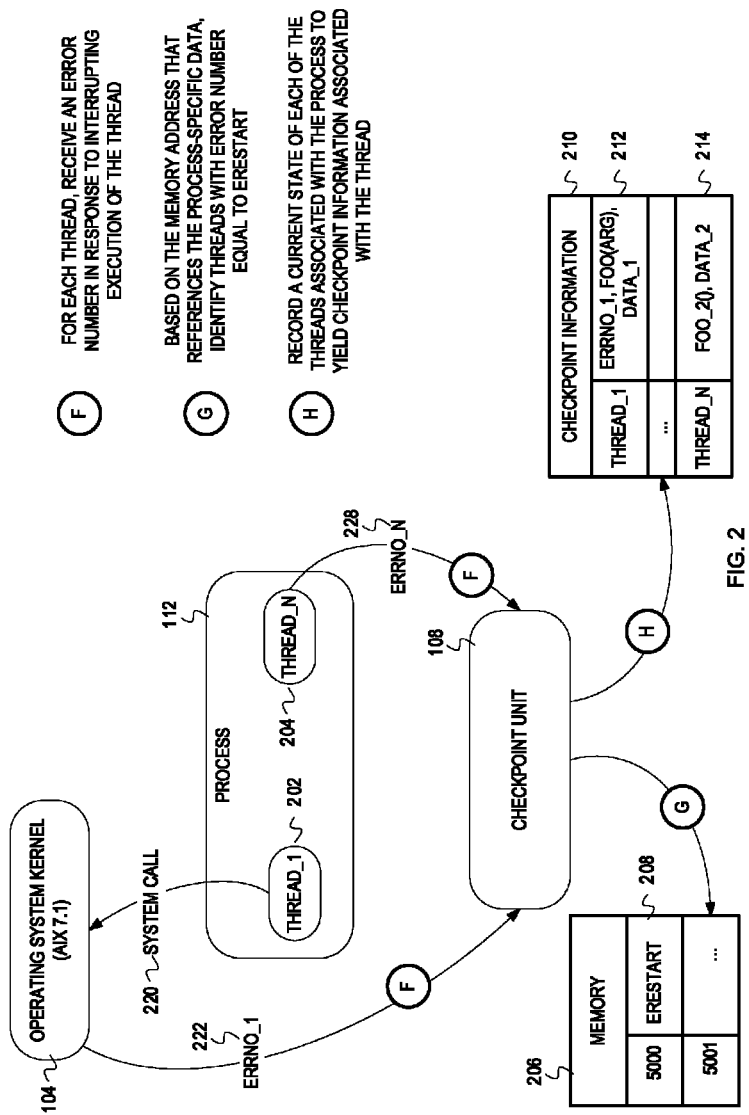
FIG. 2 is a continuation of FIG. 1 and is an example conceptual diagram that illustrates example operations for determining checkpoint information associated with the process in the versioned WPAR.

FIG. 1 and FIG. 2 depict an example conceptual diagram illustrating example operations for determining checkpoint information associated with a process in a versioned workload partition (WPAR). FIG. 1 depicts a source machine 100 comprising an operating system 102. The operating system 102 comprises an operating system kernel 104, a WPAR management unit 114, and a versioned WPAR 106. The versioned WPAR 106 comprises WPAR operating system (OS) libraries 110, a process 112, and a checkpoint unit 108. The process 112 accesses the WPAR OS libraries 110 to execute within the versioned WPAR 112.

The WPAR management unit 114 can create the versioned WPAR 106 and other WPARs as software partitions within the operating system 102. The WPARs are contained environments that are created from and that share resources (e.g., memory, kernel, processors, network cards, hard drives, and/or other software, firmware, and/or hardware) of a single managing instance of the operating system 102. The managing instance of the operating system is also referred to as a global operating system 102. For example, the WPARs may share a common AIX kernel and may comprise their own file systems, users, administrators, network space, applications, processes, etc. Each of the WPARs within the global operating system 102 can comprise applications and other workloads that execute independently within the contained environment of the WPAR.

In some implementations, the versioned WPAR 106 may be created on the source machine 100. The global operating system 102 that manages all the physical resources (e.g., memory, processor, drives, adapters, etc.) of the source machine 100 may allocate a subset of the physical resources to the versioned WPAR 106. The global operating system 102 may also allocate virtual resources to the versioned WPAR 106. In other implementations, the versioned WPAR 106 may be implemented within a logical partition (LPAR) of the source machine 100. An LPAR is generally a subset of the physical resources of the source machine 100, where the subset is virtualized and where the LPAR can operate as a separate computing device and can manage the subset of the physical resources. An operating system can be installed on the LPAR and one or more WPARs can be created in the operating system of the LPAR. The operating system of the LPAR can allocate resources to the WPAR from the subset of the physical resources allocated to the LPAR. Also, the source machine 100 could comprise multiple LPARs, each LPAR could support a different operating system, and each LPAR could support multiple WPARs.

Although traditionally, the WPARs and the global operating system 102 share an identical operating system (e.g., identical version, identical patches, identical tuning options, etc.), the versioned WPAR 106 is created to support a different version (typically an earlier version) of the operating system than the global operating system 102. The versioned WPAR 106 supports an earlier version of operating system libraries 110 that execute on top of a later version of the global operating system 102. As depicted in FIG. 1, the global operating system 102 may be a version 7.1 IBM AIX operating system, while the versioned WPAR 106 might support operating system libraries 110 that are specific to version 5.2 of the IBM AIX operating system. Thus, scripts, the process 112, and other content within the versioned WPAR 106 are compiled on version 5.2 of the operating system and are linked to version 5.2 of the WPAR OS libraries 110. Although compiled on version 5.2 of the operating system, the process 112, the libraries 110, the scripts, and other content communicate with the version 7.1 global operating system kernel 104. It is noted that although the FIGS. 1-2 refer to versions 7.1 and 5.2 of the AIX operating system, in other embodiments the global operating system can be any suitable later version of any suitable operating system, while the versioned WPAR can be associated with any suitable earlier version of the operating system. It is also noted that although FIG. 1 depicts the source machine 100 comprising one versioned WPAR 106, the source machine 100 can comprise any suitable number of WPARs.

Mobility of the versioned WPAR 106 enables the versioned WPAR 106 to be migrated from the source machine 100 to a destination machine (not shown). Typically, the source machine 100 and the destination machine support the same version of the global operating system. For example, if the source machine 100 is associated with version 7.1 global operating system, the destination machine is typically also associated with a separate instance of the version 7.1 global operating system. On receiving a request to migrate the versioned WPAR 106 from the source machine 100 to the destination machine, the global operating system 102 identifies one or more processes (e.g., the process 112) executing with the versioned WPAR 106 to be migrated. Each process 112 executing within the versioned WPAR 106 comprises its own execution environment, stack, working area, shared memory, network communication, etc.

At stage A, in response to the request to migrate the versioned WPAR 106 to the destination machine, the WPAR management unit 114 transmits a checkpoint signal 124 to the process 112 executing within the versioned WPAR 106. For example, the WPAR management unit 114 can comprise a master checkpoint process (not shown) that issues a per thread checkpoint signal 124 to the process 112. In one implementation, the checkpoint signal 124 may be in the form of an interrupt to the process to be migrated. In another implementation, the checkpoint signal 124 can cause each of the threads associated with the process 112 to sleep for a configurable time interval (e.g., by executing a thread.sleep( ) function).

Also, each process 112 of the versioned WPAR 106 is also allocated a segment of memory within which a set of executable instructions that comprise the process 112 (also known as a text segment or a code segment) is stored. The set of instructions that constitute the process 112 is typically static and therefore may not be migrated as part of the process 112. After execution of the threads that are associated with the process 112 is halted, the global operating system 102 loads the checkpoint unit 108 by designating the text memory segment associated with the process 112 as a working area for the checkpoint unit 108. The set of instructions that constitute the process 112 in the text memory segment can be replaced by a set of instructions executed by the checkpoint unit 108 for checkpointing the process 112. The checkpoint unit 108 communicates with the global operating system 102 and checkpoints the process 112 by recording a current state of process-specific data. The checkpoint unit 108 enables migration of the process 112 to the destination machine as will be further described with reference to stages B-E in FIG. 1 and stages F-H in FIG. 2.

At stage B, the checkpoint unit 108 generates a system call to the global operating system kernel 104 to determine a memory address that references process-specific data of the process 112 executing within the versioned WPAR 106. Because the versioned WPAR 106 to be migrated supports an earlier version of the operating system as compared to the global operating system 102, software and memory architecture for the two versions of the operating systems may be different. In other words, the process 112 is linked to the earlier version of the operating system libraries 110. Therefore, the process-specific data associated with the process 112 may be stored at a memory location (or a memory offset) that is different from the memory location (or memory offset) at which the process-specific data would have been stored if the process 112 were linked to the global operating system 102. Because the checkpoint unit 108 is linked to the global operating system 102 and is unaware that the process 112 is linked to the earlier version of the operating system libraries 110, the checkpoint unit 108 may access an incorrect memory location, may not encounter the requisite process-specific data, may retrieve incorrect data, and/or may interpret retrieved data incorrectly. For example, a uthread structure that comprises thread-specific information (e.g., system call parameters, results, system call state information, per-thread signal information, etc.) for the later version of the operating system may be different from a uthread structure for the earlier version of the operating system. Another example of the process-specific data is an error number. If a system call issued by the process 112 to the global operating system kernel 104 fails, the global operating system kernel 104 provides an error number that is indicative of the error encountered by the global operating system kernel 104. Error definitions for the error number are stored at a fixed offset relative to the uthread structure, which as described above could result in errors because the checkpoint unit 108 and the versioned WPAR 106 are associated with different versions of the operating system. To enable accurate checkpointing of the process 112, the checkpoint unit 108 issues a system call to the global operating system kernel 104 to request the memory address that references the process-specific data for the version of the operating system associated with the versioned WPAR 106. For example, prior to determining the checkpoint information associated with the process 112, the checkpoint unit 108 can issue the system call to the global operating system kernel 104 and can request the memory address at which the error numbers and error definitions ("errno offset") are stored in the earlier version of the operating system associated with the versioned WPAR 106. The checkpoint unit 108 can use the errno offset to interpret error codes received as a result of system calls/function calls issued by the checkpoint unit 108.

At stage C, the checkpoint unit 108 receives the memory address that references the process-specific data. For example, the checkpoint unit 108 receives, from the global operating system kernel 104, the memory address at which error definitions that correspond to the error numbers can be retrieved for the process 112 that is linked to the earlier version of the operating system libraries 110. Because the versioned WPAR 106 is created within the global operating system 102, the global operating system kernel 104 is aware of the earlier version of the operating system supported by the versioned WPAR 106 and also of the memory address that references the process-specific data for the earlier version of the operating system. At stage C, the checkpoint unit 108 is aware of the memory address that references the process-specific data (e.g., the error numbers and the corresponding error definitions). Therefore, the checkpoint unit 108 can execute operations for checkpointing the process 112 (as will be described below) irrespective of the version of the operating system supported by the versioned WPAR 106 (i.e., the earlier version of the operating system to which the process 112 is linked).

At stage D, the checkpoint unit 108 registers the memory address, that references the process-specific data, with a linked static runtime library. For example, the checkpoint unit 108 may be linked to a standard C library (e.g., libc.a) and the checkpoint unit 108 may register the received memory address with the libc.a static runtime library. Based on knowledge of the memory address that references the process-specific data, the checkpoint unit 108 can access appropriate memory locations to read the process-specific data, identify error numbers, etc.

At stage E, the checkpoint unit 108 initiates operations for checkpointing the process 112 that executes within the versioned WPAR 106. As described above, the process 112 may be associated with multiple threads and each thread can execute a subset of instructions that constitute the process 112. FIG. 2 depicts the process 112 comprising thread 202 and thread 204. Typically, to checkpoint the process 112, the threads 202 and 204 associated with the process 112 may not execute in kernel space (e.g., execute system calls) because the global operating system kernel 104 may not be checkpointed and migrated to the destination machine. Thus, to checkpoint the process 112, the system calls are made restartable and execution of the system calls is aborted to minimize dependency of the process 112 on the global operating system kernel 104. Operations of the checkpoint unit 108 for determining checkpoint information that indicates a current state of the process 112 will further be described in FIG. 2 and FIG. 4.

As described above with reference to stage A, the threads 202 and 204 associated with the process 112 to be migrated to the destination machine are halted in response to the checkpoint signal 124 The checkpoint signal 124 causes execution of the threads 202 and 204 to be suspended or aborted, consequently pausing execution of the process 112. Also, any system calls issued by the thread to the global operating system kernel 104 are aborted. In FIG. 2, the thread 202 issues a system call 220 to the global operating system kernel 104. On receiving the interrupt 224, execution of the system call 220 is aborted by the global operating system kernel 104. Once execution of the process 112 is paused, any data that has not been written to a data storage unit (e.g., a hard disk) can be flushed to the data storage unit. Such data is typically generated as a result of write requests that are not immediately mirrored to the data storage unit. The data is typically stored in a cache associated with the process 112 and is also referred to as dirty data. The process 112 can write the dirty data to the data storage unit and can notify the checkpoint unit 108 when the state of the data storage unit is current (e.g., once all the data from the cache has been flushed to the data storage unit). The checkpoint unit 108 can then begin checkpointing each segment of the data storage unit allocated to the process 112.

At stage F, for each thread associated with the process 112, the checkpoint unit 108 receives an error number in response to interrupting execution of the thread. As depicted in FIG. 2, the checkpoint unit 108 receives an error number 222 (depicted as ERRNO_1) in response to interrupting execution of the thread 202. The checkpoint unit 108 receives an error number 228 (depicted as ERRNO_N) in response to interrupting execution of the thread 204. In one implementation, the global operating system kernel 104 generates an error with the error number 222 that indicates that execution of a system call 220 generated by the thread 202 was aborted in response to the interrupt 224. For example, the global operating system kernel 104 in an IBM AIX operating system can return an "ERESTART" error number to indicate that the system call issued by the thread to the global operating system kernel 104 was aborted. The ERESTART error number can also indicate that after the process 112 is migrated to the destination machine, the system call 220 should be reissued (with the same parameters) to the global operating system kernel of the destination machine. It is noted that, depending on the implementation of the global operating system 102, the global operating system kernel 104 can return any suitable error number to indicate that the system call issued by the thread to the global operating system kernel 104 was aborted. In some implementations, the error number may be generated to indicate that execution of the thread was interrupted, irrespective of whether the thread was executing user space code or whether the thread was executing kernel space code. For example, a first error number may be generated to indicate that execution of the thread in kernel space (e.g., a system call generated by the thread) was interrupted and a second error number may be generated to indicate that execution of the thread in user space was interrupted.

At stage G, based on the memory address that references the process-specific data, the checkpoint unit 108 identifies threads with error number equal to ERESTART. The ERESTART error number can indicate that execution of a system call generated by the thread was interrupted while the system call was being executed by the global operating system kernel 104. As depicted in FIG. 2, the thread 202 generates the system call 220 (prior to receiving the checkpoint signal 124 at stage A) to the global operating system kernel 104. On receiving the checkpoint signal 124, execution of the thread is halted and the system call 220 is aborted. Accordingly, the global operating system kernel 104 generates the error number 222 that indicates that the system call 220 was aborted. In one implementation, the checkpoint unit 108 can use the memory address (received at stage D) that references the process-specific data, to identify a memory location at which to look up error numbers received from the threads 202 and 204 associated with the process 112. For example, the checkpoint unit 108 may receive the memory address 4500 at stage D that references a location in memory 206 of an error number resolution table. Based on knowledge of the memory address that references the process-specific data and based on knowledge of the error number received from the thread, the checkpoint unit 108 may identify an error definition that corresponds to the received error number. For example, the checkpoint unit 108 can use the error number to calculate an offset (or an index) for identifying, from the memory 206 associated with the process 112, the error definition that corresponds to the error number. In another implementation, the checkpoint unit 108 can compare the error number against a predetermined error number to determine whether the system call issued by the thread was aborted and whether the system call is to be reissued at the destination machine. For example, the checkpoint unit 108 can compare the error number 222 against a predetermined error number (e.g., the ERESTART error number) and determine whether the error number 222 is the ERESTART error. At stage G, the checkpoint unit 108 determines the error number 222 received from the thread 202 indicates the ERESTART error 208. The checkpoint unit 108 also determines that the error number 228 received from the thread 204 does not indicate the ERESTART error 208.

At stage H, the checkpoint unit 108 records a current state of the threads 202 and 204 associated with the process 112 to yield checkpoint information 212 associated with the thread 202 and checkpoint information 214 associated with the thread 204. The checkpoint information 212 associated with the thread 202 and checkpoint information 214 associated with the thread 204 together constitute checkpoint information 210 associated with the process 112. As depicted in FIG. 2, the checkpoint unit 108 records the current state of the thread 202 (represented as foo(arg) and data_1) as the checkpoint information 212 associated with the thread 202. Additionally, on determining that the error number 222 received from the thread 202 is the ERESTART error 208, the checkpoint unit 108 also records the error number 222 as part of the checkpoint information 212 associated with the thread. foo (arg) represents a function in the instructions executed by the thread 202 that generated the system call 220. data_1 can represent data generated during execution of the thread 202 (e.g., variables, data structures, and other data that represents the current state of the thread 202). As depicted in FIG. 2, the checkpoint unit 108 records the current state of the thread 204 (represented as foo_2( ) and data_2) as the checkpoint information 214 associated with the thread 204. data_2 can represent data generated during execution of the thread 204 (e.g., variables, data structures, and other data that represents the current state of the thread 204). Because the error number 228 received from the thread 204 is not the ERESTART error 208, the checkpoint unit 108 may not record the error number 228 as part of the checkpoint information 214 associated with the thread 204. It is noted that in some implementations, the checkpoint unit 108 may record the error number received from the thread as checkpoint information associated with the thread irrespective of whether the error number indicates the ERESTART error 208. In short, the checkpoint unit 108 captures a snapshot of the current state of the process 112 and provides, to the destination machine, the captured snapshot of the process 112 as the checkpoint information 210 associated with the process 112. The checkpoint information 210 can be used to recreate the process 112 and to resume the execution of the process 112 on the destination machine.

The checkpoint unit 108 can provide the checkpoint information 210 associated with the process 112 to the global operating system 102 of the source machine 100. The global operating system 102, in turn, can provide the checkpoint information 210 associated with the process 112 to a global operating system of the destination machine. In one implementation, the checkpoint unit 108 can save the checkpoint information 210 associated with the process 122 in a file and can transmit the file from the source machine 100 to the destination machine. In another implementation, the checkpoint unit 108 can transmit the checkpoint information 210 on the fly to the destination machine using any suitable communication protocol, such as transmission control protocol/internet protocol (TCP/IP).

Although not depicted in FIGS. 1-2, a process restoration unit implemented on the destination machine can execute operations for recreating the process 112 within a destination versioned WPAR on the destination machine. The process restoration unit can create a skeleton of the process 112 ("skeleton process") within the destination versioned WPAR and can create threads associated with the skeleton process. The process restoration unit can, based on the checkpoint information 210 received from the source machine 100, populate the skeleton process to recreate the process 112 ("reconstructed process") within the destination versioned WPAR, so that the reconstructed process is at the same state as the process 112 on the source machine 100. After all the processes within the versioned WPAR 106 on the source machine 100 are recreated within the destination versioned WPAR on the destination machine, the reconstructed processes within the destination versioned WPAR can be restarted. The reconstructed processes can continue executing within the destination versioned WPAR from the point at which they were paused on the source machine 100. Operations for recreating checkpointed processes on the destination machine are further described in FIG. 5.

Figure 3:
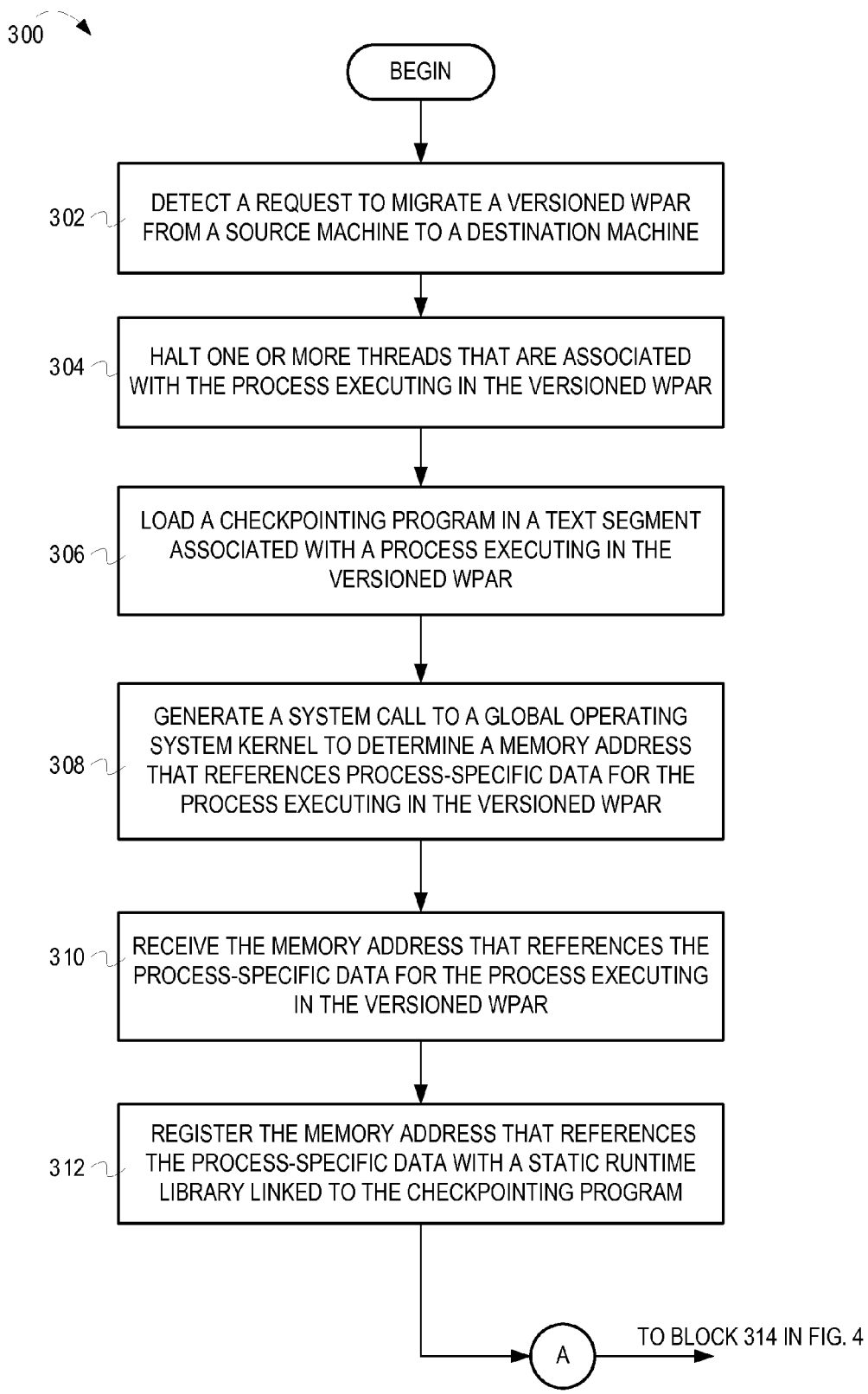
FIG. 3 depicts a flow diagram illustrating operations for identifying a memory address that references process-specific data associated with a process in a versioned WPAR.
Figure 4:
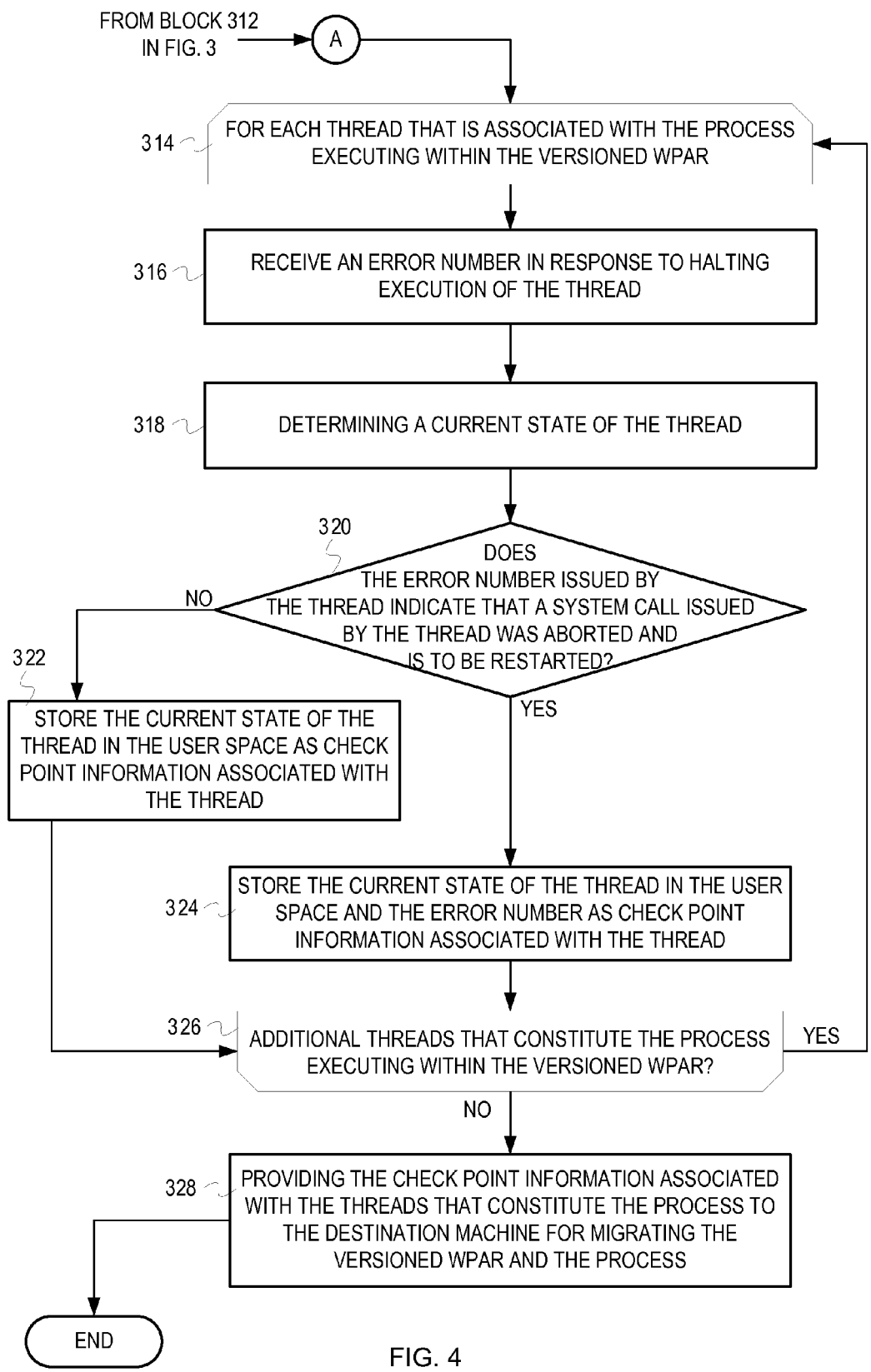
FIG. 4 is a continuation of FIG. 3 and is a flow diagram that illustrates example operations for determining checkpoint information associated with the process in the versioned WPAR.

FIG. 3 and FIG. 4 depict a flow diagram ("flow") 300 illustrating example operations for determining checkpoint information associated with a process in a versioned WPAR. The flow 300 begins at block 302 in FIG. 3.

A request to migrate a versioned WPAR from a source machine to a destination machine is detected (302). For example, with reference to FIG. 1, a global operating system 102 of the source machine 100 detects the request to migrate the versioned WPAR 106 from the source machine 100 to the destination machine. As described with reference to FIGS. 1-2, the versioned WPAR 106 is associated with an earlier version of the operating system as compared to the global operating system 102. The source machine 100 and the destination machine typically implement same version of the global operating system. The flow continues at block 304.

One or more threads that constitute the process are halted (304). For example, a master checkpoint process in the global operating system 102 can issue a per thread checkpoint signal to the process of the versioned WPAR to be migrated from the source machine to the destination machine. For example, with reference to FIG. 2, the threads 202 and 204 constitute the process 112 executing in the versioned WPAR 106. The process 112 typically comprises one or more threads that execute subsets of the instructions that constitute the process 112, or that execute as different instances of the same process 112. For example, a search engine process may comprise multiple threads each of which may service different search requests. The thread may execute user space code or kernel space code. The kernel space code comprises instructions that constitute the global operating system kernel 104, kernel extensions, device drivers, etc. The user space code comprises instructions and data associated with applications, software, libraries with which the applications/software interact, etc. The checkpoint signal can indicate that the interrupt is being issued to facilitate checkpointing of the threads associated with the process 112. In one implementation, the checkpoint signal may be in the form of an interrupt to the process to be migrated. In another implementation, the checkpoint signal can cause the thread to sleep for a configurable time interval (e.g., by executing a thread.sleep( ) function). On receiving the checkpoint signal, the process 112 can cause the one or more threads that constitute the process to be blocked. In other words, execution of the one or more threads is halted and the state of the threads is frozen. The flow continues at block 306.

A checkpoint program is loaded in a text memory segment associated with a process executing in the versioned WPAR (306). For example, the global operating system 102 causes the checkpoint unit 108 to be loaded in the text memory segment associated with the process 112 to be checkpointed. The text memory segment associated with the process 112 may be a pre-defined segment of memory that comprises executable instructions that constitute the process 112. For example, in an AIX operating system, the global operating system 102 may designate segment one of a subset of memory allocated to the process 112 as the text memory segment associated with the process 112. The text memory segment associated with the process 112 is static (i.e., the executable instructions that constitute the process 112 do not change with time or with execution of the process 112). Therefore, the text memory segment associated with the process 112 need not be checkpointed or migrated to the destination machine. To checkpoint the process 112, the global operating system 102 replaces the executable instructions that constitute the process 112 from the text memory segment and loads the checkpoint unit 108. The checkpoint unit 108 may comprise a compact self-contained program that is statically linked to the global operating system 102. This is because if the checkpoint unit 108 is dynamically linked to global operating system 102, the checkpoint unit 108 may unload the earlier version of the operating system libraries (and other content associated with the process 112) and may load the later version of the operating system libraries (and other content associated with the checkpoint unit 108). This can corrupt the current state of the process 112 to be checkpointed. As will be described below in blocks 306 to 330, the checkpoint unit 108 can access all the memory segments allocated to the process 112, identify information that represents the current state of the process 112, and checkpoint (or record) the information that represents the current state of the process 112. The flow continues at block 308.

A system call is generated to a global operating system kernel to determine a memory address that references process-specific data for the process executing in the versioned WPAR (308). For example, the checkpoint unit 108 generates and issues the system call to the global operating system kernel 104. The checkpoint unit 108 can request the memory address that references the process-specific data for the process 112 to avoid errors that may be encountered because the checkpoint unit 108 is linked to the global operating system 102 (i.e., a later version of the operating system), while the process 112 to be checkpointed is linked to the earlier version of the operating system. The process-specific data can comprise error numbers and corresponding error definitions for the earlier version of the operating system supported by the versioned WPAR. The flow continues at block 310.

The memory address that references the process-specific data for the process executing in the versioned WPAR is received (310). For example, the checkpoint unit 108 receives, from the global operating system kernel 104, the memory address that references the process-specific data for the process 112 executing in the versioned WPAR 106. The memory address received by the checkpoint unit 108 can indicate a location, in memory, from which error numbers and their corresponding error definitions can be identified. The received memory address may be specific to the process 112 and to the version of the operating system libraries 110 with which the process 112 is linked. The flow continues at block 312.

The memory address that references the process-specific data is registered with a static runtime library linked to the checkpoint program (312). For example, the checkpoint unit 108 registers the memory address that references the process-specific data (received at block 208 from the global operating system kernel 104) with the static runtime library (e.g., a standard C library (libc)) to which the checkpoint unit 108 is linked. On subsequently receiving an error number from the global operating system kernel 104, the checkpoint program 108 can access the appropriate memory address to locate an error definition that corresponds to the error number via the static runtime library. The flow continues at block 314 in FIG. 4.

A loop begins for each thread that is associated with the process executing within the versioned WPAR (314). For example, the checkpoint unit 108 performs a set of operations described in blocks 316-326 for each of the threads 202 and 204 that are associated with the process 112. The flow continues at block 316.

An error number is received in response to halting execution of the thread (316). For example, the checkpoint unit 108 receives the error number 222 in response to halting the execution of the thread 202. The checkpoint unit 108 receives the error number 228 in response to halting the execution of the thread 204. On receiving the interrupt, execution of the thread is paused. Any system calls issued by the thread to the global operating system kernel 104 are aborted. The global operating system kernel 104 can generate an error with a predetermined error number if a system call issued by the thread to the global operating system kernel 104 is aborted in response to the interrupt. As an example, the global operating system kernel 104 in an IBM AIX operating system can return an ERESTART error number to indicate that the system call issued by the thread to the global operating system kernel 104 was aborted. However, depending on the global operating system 102 associated with the source machine 100, the global operating system kernel 104 can return any suitable predetermined error number to indicate that the system call issued by the thread was aborted. For example, a thread may execute a function foo. Execution of the function foo can cause a system call bar to be issued to the global operating system kernel 104. Control passes from user space (e.g., instructions of the process 112 including the function foo) to kernel space where the global operating system kernel 104 processes the system call bar. The thread may receive the interrupt while the global operating system kernel 104 is processing the system call bar. Consequently, the global operating system kernel 104 can abort execution of the system call bar, the global operating system kernel 104 can issue the ERESTART error number 208, and control can pass back to the user space. The flow continues at block 318.

A current state of the thread is determined (318). For example, the checkpoint unit 108 determines the current state of the threads 202 and 204 in the user space. The checkpoint unit 108 can determine the state of the thread 202 at the instant when the interrupt was issued. The checkpoint unit 108 can record the content of memory segments allocated to the thread 202, an instruction that was last executed by the thread, and other information associated with the thread that is necessary to reconstruct the thread and consequently the process 112 on the destination machine. If execution of an instruction or a function caused a system call to be issued and to subsequently be aborted, the checkpoint unit 108 may also record the instruction/function and indicate that the instruction/function is to be re-executed. With reference to the example of block 316 where the function foo generated the system call bar and execution of the system call bar was aborted, the checkpoint unit 108 checkpoints the thread at the point where control passes back to the user space. For example, the current state of the thread may be identified as the function foo. As will be described below, at the destination machine, the function foo can be restarted and the system call bar can be reissued to the global operating system kernel 104. The flow continues at block 320.

It is determined whether the error number indicates that a system call issued by the thread was aborted and is to be restarted (320). For example, the checkpoint unit 108 determines whether the error number 222 indicates that a system call issued generated by the thread 202 returned to user space with error ERESTART. In one implementation, the memory address can indicate where (in memory) error definitions for the error numbers can be identified. In one implementation, the checkpoint unit 108 can calculate an index based on the error number and can search a subset of memory locations (e.g., beginning at the memory address received at block 310) to identify the error definition that corresponds to the received error number. Based on knowledge of the memory address that references the process-specific data and based on knowledge of the error number received from the thread, the checkpoint unit 108 may identify an error definition that corresponds to the received error number. In another implementation, the checkpoint unit 108 can compare the received error number with a predetermined error number and determine whether the received error number is equal to the predetermined error number. For example, the checkpoint unit 108 can determine whether the received error number is equal to ERESTART. The error number associated with the thread being equal to ERESTART can indicate that the system call issued by the thread was aborted and that the system call is to be reissued after the process 112 is migrated to the destination machine. Alternately, if the error number associated with the thread is not equal to ERESTART, it may be determined that a system call was not issued by the thread, that the system call issued by the thread was not aborted, and/or that the system call is not to be reissued at the destination machine. In some implementations, an error number may not be generated unless a system call issued to the operating system kernel 104 was aborted. Thus, in determining whether the error number indicates that a system call issued by the thread was interrupted, it may also be determined whether the error number associated with the thread was received. In another implementation, an error number may be generated in response to interrupting the thread. The checkpoint unit 108 may receive a different error number depending on whether or not the system call issued to the operating system kernel 104 was aborted. Furthermore, it is noted that depending on the global operating system 102 implemented on the source machine 100, any suitable predetermined error number can be issued by the global operating system kernel 104. If it is determined that the error number received from the thread indicates that execution of a system call generated by the thread was interrupted, the flow continues at block 324. Otherwise, the flow continues at block 322.

The current state of the thread in the user space is stored as checkpoint information associated with the thread (322). For example, the checkpoint unit 108 stores the current state of the thread 204 as the checkpoint information 214 associated with the thread 204. The flow 300 moves from block 320 to block 322 on determining that the error number 228 received from the thread 204 does not indicate that execution of a system call generated by the thread 204 was interrupted. The checkpoint information associated with the thread can comprise data generated during execution of the thread, a last executed instruction/function, etc. In some implementations, the checkpoint information associated with the thread may also include an error number associated with the thread. The flow continues at block 326.

The current state of the thread in the user space and the error number received from the thread are stored as checkpoint information associated with the thread (324). For example, the checkpoint unit 108 stores the current state of the thread 202 and the error number 222 received from the thread 202 as the checkpoint information 212 associated with the thread 202. The flow 300 moves from block 320 to block 324 on determining that the error number 222 received from the thread 202 indicates that execution of a system call 220 generated by the thread 202 was interrupted. The checkpoint information associated with the thread can comprise data generated during execution of the thread, a last executed instruction/function, and the error number associated with the thread. The error number associated with the thread can be a predetermined error number that indicates that a system call issued by the thread to the global operating system kernel 104 was aborted. The flow continues at block 326.

It is determined whether additional threads that constitute the process executing within the versioned WPAR remain to be analyzed (326). For example, the checkpoint unit 108 determines whether additional threads that constitute the process 112 executing within the versioned WPAR 106 on the source machine 100 remain to be analyzed for migration purposes. If it is determined that additional threads that constitute the process 112 remain to be analyzed, the flow loops back to block 314 where a next thread that constitutes the process 112 is identified and operations described with reference to blocks 316-326 are executed for the next thread. Otherwise, the flow continues at block 328.

The checkpoint information associated with all the threads that constitute the process ("checkpoint information associated with the process") are provided to the destination machine for migrating the versioned WPAR and the process (328). For example, the checkpoint unit 108 provides the checkpoint information 210 associated with the process 112 to the global operating system 102 of the source machine 100 (e.g., to the master checkpoint process). The global operating system 102, in turn, can provide the checkpoint information 210 associated with the process 112 to an operating system of the destination machine. In one implementation, the checkpoint information 210 can be stored before being provided to the destination machine. In another implementation, the checkpoint information 210 can be dynamically provided to the destination machine. A process restoration unit implemented on the destination machine can execute operations described in FIG. 5 for reconstructing the process 112 within a destination versioned WPAR of the destination machine. From block 328, the flow ends.

Although not depicted in FIGS. 1-4, the operations described in FIGS. 3 and 4 for checkpointing a process is executed for each process executing within the versioned WPAR 106 to be migrated. For example, if the versioned WPAR 106 comprises ten processes, ten different instances of the checkpoint unit 108 are loaded in respective text memory segments associated with each of the ten processes executing in the versioned WPAR 106. The global operating system 102 (or the master checkpoint process) receives the checkpoint information associated with each of the ten processes and provides the checkpoint information associated with each of the ten processes to the destination machine. As will be described in FIG. 5, at the destination machine, the state at which the process was paused can be recreated from the checkpoint information. The system calls that were aborted can be identified and can be reissued to a global operating system kernel of the destination machine.

Figure 5:
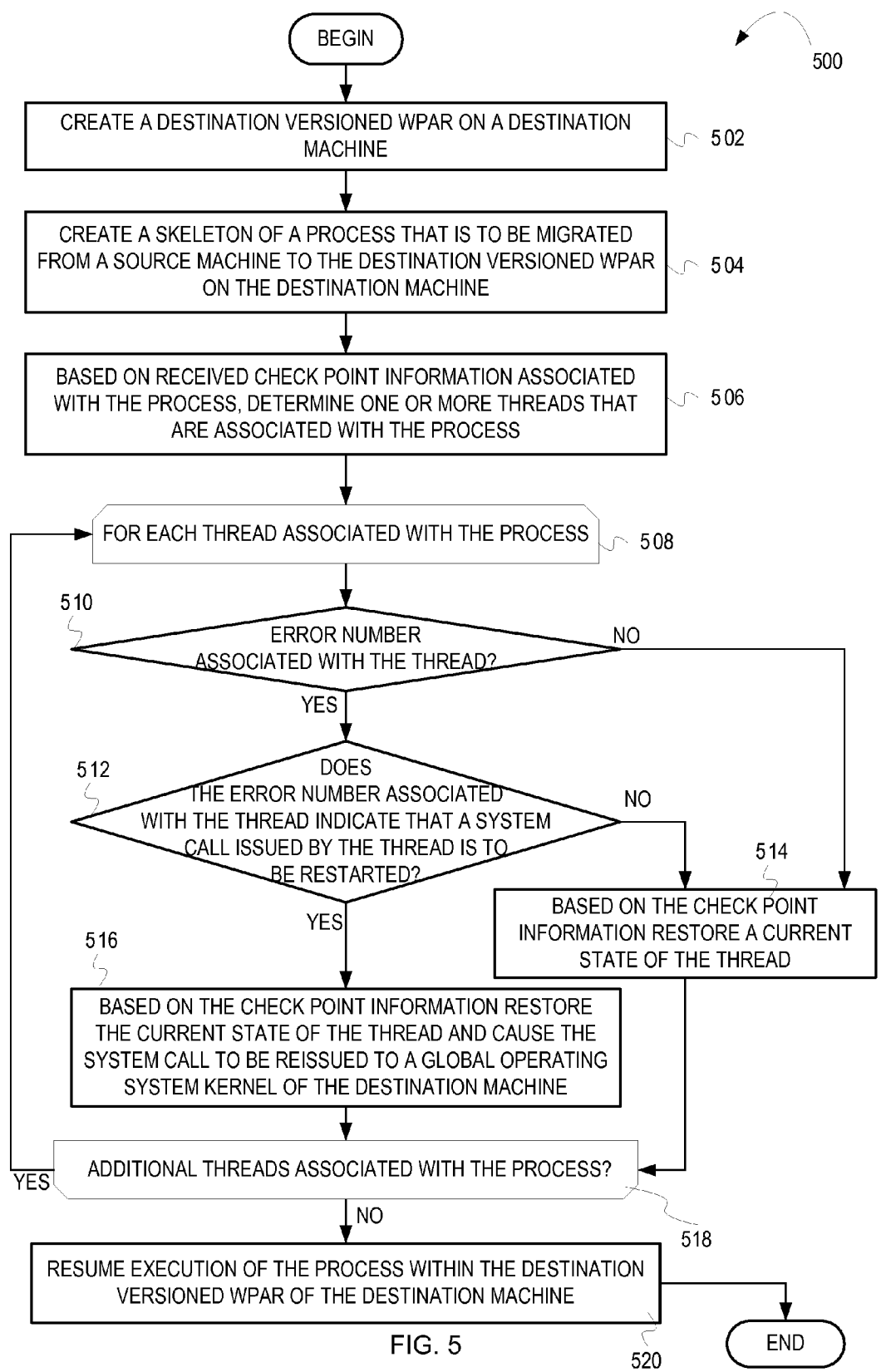
FIG. 5 is a flow diagram illustrating example operations for reconstructing a process migrated to a destination machine.

FIG. 5 is a flow diagram 500 illustrating example operations for reconstructing a process migrated to a destination machine. The flow 500 begins at block 502.

A destination versioned WPAR is created on a destination machine (502). For example, to recreate the versioned WPAR 106 of FIG. 1 that is to be migrated from the source machine 100 to the destination machine, a global operating system of the destination machine can create the destination versioned WPAR on the destination machine. As described above, the global operating system is an underlying operating system of the machine on which it executes (in this case the destination machine). The flow continues at block 504.

A skeleton of a process that is to be migrated from the source machine is created within the destination versioned WPAR on the destination machine (504). For example, the global operating system of the destination machine can create the skeleton of the process 112 that is to be migrated from the versioned WPAR 106 of the source machine 100 to the destination versioned WPAR of the destination machine. The skeleton of the process 112 may be a partially functional (or a template) version of the process 112 and can comprise abstract methods, method stubs, empty function declarations, etc. The skeleton of the process 112 can then be progressively expanded based on checkpoint information associated with the process 112 to reconstruct the process 112 as will be described below. Additionally, the operating system of the destination machine can also load a process restoration unit in a text memory segment associated with the skeleton of the process 112 in the destination versioned WPAR. As described above, the text memory segment is allocated for storing executable instructions that constitute the process. The global operating system of the destination machine can read checkpoint information 210 received from the source machine 100 and can determine the number of processes that are to be migrated. Each process to be migrated from the versioned WPAR 106 to the destination versioned WPAR is allocated a unique text memory segment. Thus, the global operating system of the destination machine can load a new instance of the process restoration unit in each text memory segment allocated to each of the processes to be migrated. The process restoration unit can execute operations described in blocks 506-518 to recreate and restore (in the destination versioned WPAR of the destination machine) a current state of one or more processes that were previously executing within the versioned WPAR 106 on the source machine 100. The flow continues at block 506.

Based on received checkpoint information associated with the process, one or more threads that are associated with the process are determined (506). For example, the process restoration unit can analyze the checkpoint information 210 associated with the process 112 and can determine a number of threads that were executing as part of the process 112 when the process 112 was checkpointed on the source machine 100. The flow continues at block 508.

A loop begins for each thread associated with the process (508). For example, the process restoration unit can execute operations described in blocks 510-516 for each thread that is associated with the process. Based on the checkpoint information, the process restoration unit can restore the state of the threads that constitute the process as described in blocks 510-516. The flow continues at block 510.

It is determined whether the checkpoint information associated with the thread comprises an error number associated with the thread (510). For example, the process restoration unit can determine whether the checkpoint information 212 associated with the thread 202 comprises an error number associated with the thread 202. Likewise, the process restoration unit can determine whether the checkpoint information 214 associated with the thread 204 comprises an error number associated with the thread 204. The error number can be used to determine whether instructions are to be re-executed, functions are to be restarted, and system calls are to be reissued to the global operating system of the destination machine. If it is determined that checkpoint information associated with the thread comprises an error number associated with the thread, the flow continues at block 512. Otherwise, the flow continues at block 514.

It is determined whether the error number associated with the thread indicates that a system call issued by the thread is to be restarted (512). For example, the process restoration unit can determine whether the error number 222 associated with the thread 202 indicates that a system call generated by the thread 202 to the global operating system kernel 104 of the source machine 100 was interrupted and is to be restarted. Likewise, the process restoration unit can determine whether the error number 228 associated with the thread 204 indicates that a system call generated by the thread 204 to the global operating system kernel 104 of the source machine 100 was interrupted and is to be restarted. In one implementation, the process restoration unit can determine whether the error number indicates an ERESTART error. The ERESTART error can indicate that a system call issued by the thread was aborted at the source machine and that the system call is to be reissued at the destination machine. If the system call to the global operating system kernel 104 of the source machine 100 was aborted as a result of migrating the process 112 from the versioned WPAR 106 to the destination versioned WPAR, the process restoration unit can cause functions/instructions to be reexecuted and the system call to be reissued (e.g., with the same parameters) to the global operating system kernel of the destination machine. If it is determined that the error number associated with the thread indicates that execution of a system call previously issued by the thread is to be reissued, the flow continues at block 516. Otherwise, the flow continues at block 514.

Based on the checkpoint information associated with the thread, a current state of the thread in user space is restored (514). For example, the process restoration unit can restore the current state of the thread 204 based on the checkpoint information 214 associated with the thread 204. The flow 500 moves from block 512 to block 514 on determining that the error number 228 for the thread 204 does not indicate that a system call issued by the thread 204 is to be reissued to the global operating system kernel of the destination machine. The flow 500 also moves from block 510 to block 514 on determining that the checkpoint information associated with the thread 204 does not comprise an error number associated with the thread 204. Based on the checkpoint information 214 associated with the thread 204, the process restoration unit can populate memory segments allocated to the thread 204 to recreate the state (of the memory and the thread) at which the thread was paused on the source machine 100. For example, the process restoration unit can receive an indication that memory location 5000 on the source machine 100 was associated with the process 112 and comprised data data_1 associated with the thread 204. Accordingly, in restoring the state of the thread 204 within the skeleton of the process 112 on the destination machine, the process restoration unit can store the data data_1 at the memory location 5000 on the destination machine. The process restoration unit can also populate, based on the checkpoint information 214, various other memory segments (e.g., libraries, working area, heap, stack, etc.) associated with the process 112. It is noted, however, that the process restoration unit need not populate the same memory locations on the destination machine as those on the source machine. For example, the process restoration unit may not store the data data_1 at the memory location 5000 on the destination machine. Instead, the process restoration unit can identify (e.g., based on memory allocated by the global operating system of the destination machine for the processes being migrated) an appropriate memory location of the destination machine at which to store the data data_1. The flow continues at block 518.

Based on the checkpoint information associated with the thread, a current state of the thread is restored and the interrupted system call generated by the thread is reissued to the global operating system kernel of the destination machine (516). The flow 500 moves from block 512 to block 516 on determining that the error number 222 associated with the thread 202 indicates that execution of the system call 220 issued by the thread 202 to the global operating system kernel 104 of the source machine 100 was interrupted and that the system call 220 is to be reissued. For example, the process restoration unit can restore the current state of the thread 202 based on the checkpoint information 212 associated with the thread 202. Based on the checkpoint information 212 associated with the thread 202, the process restoration unit can populate memory segments allocated to the thread 202 to recreate the state (including libraries, working area, heap, stack, etc.) at which the thread 202 was paused on the source machine 100. The process restoration unit can also determine whether/which instructions are to be executed, whether/which functions are to be re-executed to issue the system call that was previously aborted, etc. The process restoration unit can cause the system call 220 to be issued to the global operating system kernel of the destination machine. The flow continues at block 518.

It is determined whether additional threads associated with the process are to be recreated within the skeleton of the process (518). For example, the process restoration unit determines whether additional threads associated with the process 112 to be migrated from the versioned WPAR 106 of the source machine 100 are to be created to reconstruct the process 112 within the destination versioned WPAR of the destination machine. If it is determined that additional threads are to be recreated, the flow loops back to block 508, where a next thread that is associated with the process 112 is identified from the checkpoint information 210 and operations described with reference to blocks 510-516 are executed for the next thread. Otherwise, the process 112 of the versioned WPAR 106 is deemed to be re-created ("reconstructed process") in the destination versioned WPAR and the flow continues at block 520.

Execution of the reconstructed process is resumed within the destination versioned WPAR of the destination machine (520). After the process restoration unit restores the state of all the threads associated with the process 112 and when the current state of the reconstructed process is equivalent to the state of the process 112 on the source machine 100, the global operating system of the destination machine can unload the process restoration unit from the text memory segment associated with the reconstructed process. The global operating system of the destination machine can load the executable instructions that constitute the process 112 (and the reconstructed process) in the text memory segment associated with the reconstructed process. It is noted that the global operating system 104 of the source machine and the global operating system of the destination machine can access a common file system that comprises executable instructions that constitute various processes being executed on one or more machines. In one implementation, the checkpoint information 210 received from the source machine 100 can identify a memory address within the file system from which the executable instructions that constitute the process 112 can be retrieved. In another implementation, based on an identifier of the process 112, the global operating system of the destination machine can identify the executable instructions that constitute the process 112 from the file system. After the process restoration unit is replaced by the executable instructions that constitute the process 112, the global operating system of the destination machine can cause the reconstructed process within the destination versioned WPAR of the destination machine to resume execution. From block 520, the flow ends.

It should be understood that the depicted diagrams (FIGS. 1-5) are examples meant to aid in understanding embodiments and should not be used to limit embodiments or limit scope of the claims. Embodiments may perform additional operations, fewer operations, operations in a different order, operations in parallel, and some operations differently. For example, although examples refer to an earlier version and a later version of an IBM AIX operating system, embodiments are not so limited. In other implementations, operations described herein with reference to FIGS. 1-5 can be implemented on any suitable operating systems. Also, although FIGS. 1-5 describe operations for migrating a versioned WPAR 106 that comprises a single process 112, it is noted that the versioned WPAR 106 to be migrated can comprise any suitable number of processes, applications, and workloads that may be checkpointed to migrated the versioned WPAR 106. In some implementations, each process may be reconstructed sequentially within the destination versioned WPAR, while in other implementations, the processes may be reconstructed in parallel. In some implementations, execution of the reconstructed process may be resumed as soon as operations for reconstructing the process in the destination versioned WPAR (e.g., the current execution state of the process is restored) are complete. In other implementations, execution of the reconstructed process may be resumed only after all the processes of the versioned WPAR 106 have been reconstructed within the destination versioned WPAR (i.e., the destination versioned WPAR is at the same state as the versioned WPAR 106 of the source machine 100).

It is also noted, that in some implementations, the memory address that references the process-specific data (e.g., an address of thread-specific error numbers) can be determined after execution of each of the threads is frozen. In other words, the one or more threads associated with the process may be identified and a loop can be executed to freeze execution of the thread, determine a memory address of the thread-specific error number associated with the thread, and to accordingly determine whether a system call issued by the thread was aborted and is to be restarted at the destination machine.

FIGS. 1-4 depict the global operating system kernel 104 generating a predefined error number (e.g., the ERESTART error number) to indicate an aborted system call. FIGS. 1-5 also indicate that on identifying the ERESTART error number, the function (foo) that issued the system call (bar) can be restarted and the system call can be reissued to a global operating system kernel of the destination machine. However, to support the ERESTART error number, to enable the function that issued the system call to be restarted (represented by the function _foo_restart), and to enable the system call bar to be reissued to the global operating system of the destination machine (after receiving the ERESTART error number), the definition of the function foo that issues the system call may be modified. Functionality for restarting the function foo (i.e., support for the function _foo_restart) may not be part of the earlier version of the operating system kernel or may not be part of the earlier version of the operating system libraries because the earlier version of the operating system kernel may not support restarting the function foo or may not cause the system call bar to be reissued.

However, because the function foo is modified to enable proper migration of the versioned WPAR, compilation errors may be generated in trying to compile the modified version of the function foo on the earlier version of the operating system (supported by the versioned WPAR) because the earlier version of the operating system kernel may not recognize the function _foo_restart and because the earlier version of the operating system libraries may not support the function _foo_restart. However, the earlier version of the operating system libraries cannot be drastically modified to preserve integrity of the earlier version of the operating system libraries and to ensure that the earlier version of the operating system libraries execute without hindrance on the corresponding version of the operating system. Furthermore, the modified version of the function foo should be capable of executing on the earlier version of the operating system and also on the later version of the operating system. For this, the new functions (e.g., _foo_restart) are stubbed in the earlier version of the operating system kernel. When this modified function foo executes via the stubbed earlier version of the operating system kernel, interrupting the system call bar will not cause the stubbed earlier version of the operating system kernel to return the ERESTART error number (e.g., because the stubbed earlier version of the operating system kernel is unaware of the ERESTART error number). Therefore, operations for executing _foo_restart will not be invoked. In other words, operation of the modified function foo will not be impaired/modified when executing via the earlier version of the operating system. When this modified function foo executes via the later version of the operating system kernel, interrupting the system call bar will cause the later version of the operating system kernel to return the ERESTART error number. Therefore, operations for executing _foo_restart will be invoked.

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
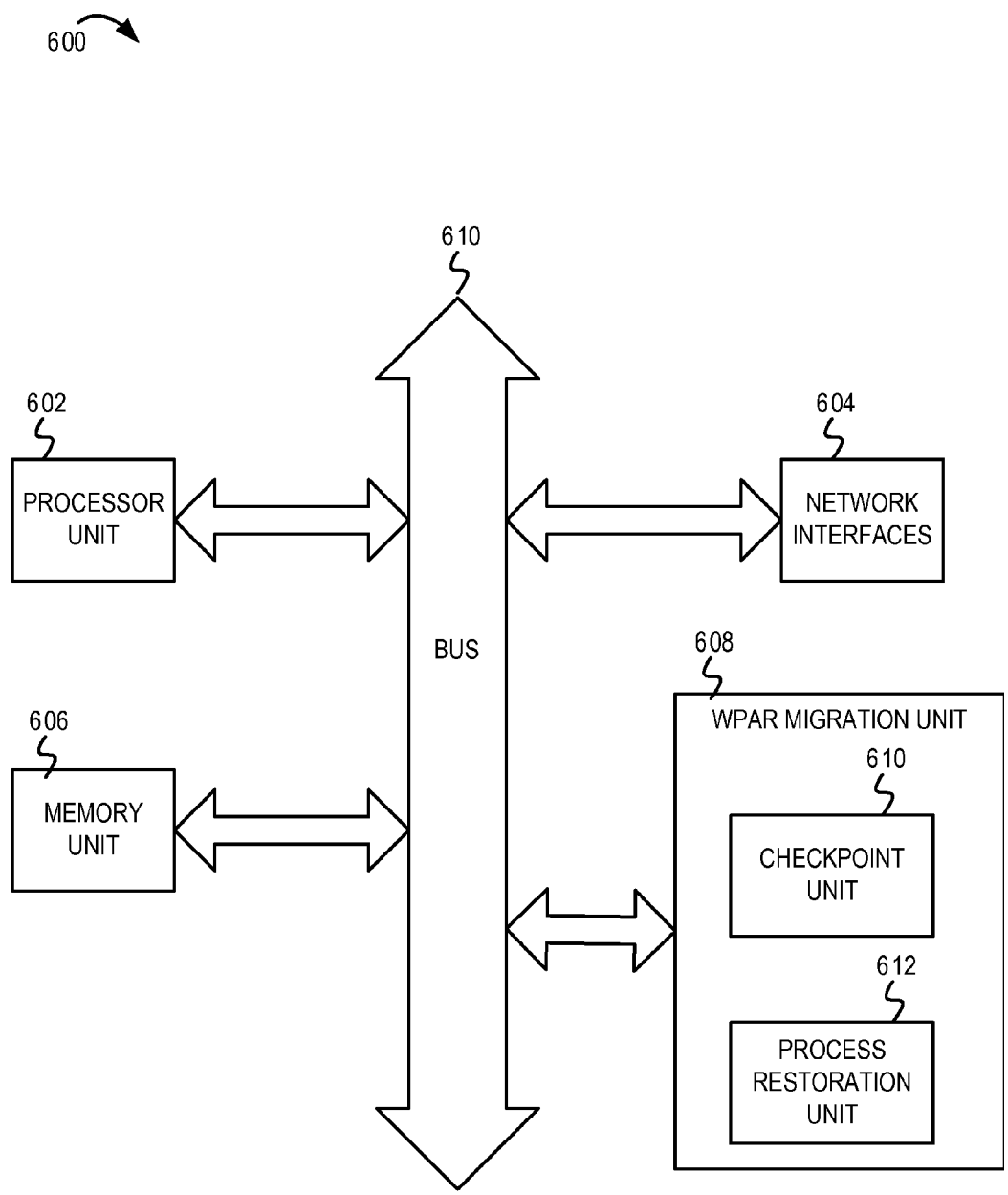
FIG. 6 is a block diagram of one embodiment of a computer system configured for reconstructing a process migrated to a destination machine.

FIG. 6 is a block diagram of one embodiment of a computer system 600 configured for migrating versioned WPARs. In some implementations, the computer system 600 may be one of a personal computer (PC), a server, or other electronic system capable of virtual memory management. The computer system 600 includes a processor unit 602 (possibly including multiple processors, multiple cores, multiple nodes, and/or implementing multi-threading, etc.). The computer system 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 600 also includes a bus 610 (e.g., PCI, ISA, PCI-Express, HyperTransport®, InfiniBand®, NuBus, AHB, AXI, etc.), and network interfaces 604 that include one or more of a wireless network interface (e.g., a WLAN interface, a Bluetooth® interface, a WiMAX interface, a ZigBee® interface, a Wireless USB interface, etc.) and a wired network interface (e.g., an Ethernet interface).

The computer system 600 also includes a WPAR migration unit 608. The WPAR migration unit 608 comprises a checkpoint unit 610 and a process restoration unit 612. On determining that a versioned WPAR is to be migrated from the computer system 600 to a destination system, a global operating system of the computer system 600 can load the checkpoint unit 610. The checkpoint unit 610 can execute operations for checkpointing one or more processes associated with the versioned WPAR of the computer system 600 as described with reference to FIGS. 1-4. If a versioned WPAR is to be migrated to the computer system 600 from a source system, the global operating system of the computer system 600 can load the process restoration unit 612. The process restoration unit 612 can execute operations for reconstructing, from checkpoint information, one or more processes associated with the versioned WPAR of the source machine on a destination versioned WPAR of the computer system 600 as described with reference to FIG. 5.

It is noted that any one or more of the components of the WPAR migration unit 608 can be implemented in hardware and/or software on a common chip or integrated circuit, on separate chips and then coupled together, etc. Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, and the network interfaces 606 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, techniques for migrating versioned WPARs as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, at a source machine associated with a global operating system, that a workload partition associated with a first version of an operating system is to be migrated from the source machine to a destination machine, wherein the first version of the operating system is an earlier version than the global operating system;
    halting execution of one or more threads associated with a process executing within the workload partition to be migrated from the source machine to the destination machine;
    for each of the one or more threads associated with the process executing within the workload partition,
        receiving an error number associated with the thread in response to said halting the execution of the thread;
        determining at least a current state of the thread as checkpoint information associated with the thread based, at least in part, on the error number associated with the thread; and
    providing the checkpoint information associated with each of the one or more threads associated with the process executing within the workload partition to the destination machine to migrate the workload partition from the source machine to the destination machine.

2. The method of claim 1, further comprising:
    providing the error number associated with each of the one or more threads associated with the process to the destination machine.

3. The method of claim 1, wherein said determining at least the current state of the thread as checkpoint information associated with each of the one or more threads associated with the process executing within the workload partition comprises:
    determining, from a kernel of the global operating system at the source machine, a memory address that references process-specific data for a process executing within the workload partition to be migrated from the source machine to the destination machine;
    for each of one or more threads associated with the process executing within the workload partition,
        based on the memory address that references the process-specific data of the process, determining whether the error number associated with the thread indicates that a system call generated by the thread was interrupted during execution of the system call by the kernel of the global operating system, wherein the memory address references a definition for the error number associated with the thread;
        determining the current state of the thread and the error number associated with the thread as the checkpoint information associated with the thread in response to determining that the error number associated with the thread indicates that a system call generated by the thread was interrupted during execution of the system call by the kernel of the global operating system; and
        determining the current state of the thread in response to determining that the error number associated with the thread does not indicate that the system call generated by the thread was interrupted during execution of the system call by the kernel of the global operating system.

4. The method of claim 3, wherein said determining, from the kernel of the global operating system at the source machine, the memory address that references the process-specific data for the process executing within the workload partition to be migrated from the source machine to the destination machine comprises:
    generating, at the source machine, a request, to the kernel of the global operating system, for the memory address that references the process-specific data for the process executing within the workload partition to be migrated from the source machine to the destination machine; and receiving, at the source machine, the memory address that references the process-specific data for the process executing within the workload partition.

5. The method of claim 4, wherein said receiving the memory address that references the process-specific data for the process executing within the workload partition further comprises:

storing, at the source machine, the memory address that references the process-specific data for the process executing within the workload partition.

6. The method of claim 5, wherein said storing the memory address that references the process-specific data for the process executing within the workload partition further comprises:

registering, at the source machine, the memory address that references the process-specific data for the process with one or more libraries associated with the global operating system.

7. The method of claim 3, wherein the process-specific data comprises an indication of one or more error numbers for the first version of the operating system with which the process executing within the workload partition is associated.

8. The method of claim 1, wherein said determining at least the current state of the thread as checkpoint information associated with each of the one or more threads associated with the process executing within the workload partition comprises:

for each of one or more threads associated with the process executing within the workload partition, determining whether the error number associated with the thread indicates that a system call generated by the thread was interrupted during execution of the system call by the kernel of the global operating system;

determining the current state of the thread and the error number associated with the thread as the checkpoint information associated with the thread in response to determining that the error number associated with the thread indicates that a system call generated by the thread was interrupted during execution of the system call by the kernel of the global operating system; and determining the current state of the thread in response to determining that the error number associated with the thread does not indicate that the system call generated by the thread was interrupted during execution of the system call by the kernel of the global operating system.

9. The method of claim 1, wherein said determining that the workload partition associated with the first version of the operating system is to be migrated from the source machine associated with the global operating system to the destination machine further comprises:

identifying one or more processes executing within the workload partition to be migrated from the source machine to the destination machine, wherein the one or more processes are compiled on the first version of the operating system.

10. The method of claim 1, wherein said providing the checkpoint information associated with each of the one or more threads associated with the process executing within the workload partition to the destination machine comprises:

storing the checkpoint information associated with each of the one or more threads associated with the process prior to said providing the checkpoint information associated with each of the one or more threads associated with the process executing within the workload partition to the destination machine, or dynamically transmitting the checkpoint information associated with each of the one or more threads associated with the process executing within the workload partition to the destination machine.

11. The method of claim 1, wherein said halting the execution of the one or more threads associated with the process comprises generating a checkpoint control signal to halt the execution of the thread.

12. A method comprising:

receiving, at a destination machine associated with a global operating system, checkpoint information associated with a process executing within a first workload partition associated with a first version of an operating system of a source machine associated with a second instance of the global operating system, wherein the first version of the operating system is an earlier version than the global operating system;

for each of one or more threads, indicated by the checkpoint information, associated with the process, determining, at the destination machine, whether an error number associated with the thread indicates that a system call generated by the thread was interrupted during execution of the system call by a kernel of the second instance of the global operating system of the source machine, wherein the checkpoint information associated with the thread comprises the error number associated with the thread;

restoring, at the destination machine, a state of the thread when execution of the thread was halted on the source machine based on the checkpoint information, and causing the system call to be reissued to a kernel of the global operating system of the destination machine, to yield a reconstructed version of the process at the destination machine, in response to determining that the error number associated with the thread indicates that the system call generated by the thread was interrupted at the source machine; and restoring the state of the thread when execution of the thread was halted on the source machine to yield the reconstructed version of the process at the destination machine in response to determining that the error number associated with the thread indicates that the system call generated by the thread was not interrupted at the source machine.

13. The method of claim 12, further comprising causing the reconstructed version of the process to resume execution within a second workload partition associated with a second instance of the first version of the operating system, wherein the second workload partition is implemented on the destination machine.

14. The method of claim 12, wherein said determining, at the destination machine for each of the one or more threads associated with the process, whether the error number associated with the thread indicates that a system call generated by the thread was interrupted during execution of the system call by the kernel of the second instance of the global operating system of the source machine, comprises:

determining whether the checkpoint information indicates the error number associated with the thread, or determining whether the error number associated with the thread is equal to a predetermined error number that indicates that the system call was interrupted.

15. The method of claim 12, wherein the checkpoint information associated with the process comprises checkpoint information associated with each of the one or more threads associated with the process, wherein the checkpoint information associated with each of the one or more threads comprises at least one of the state of the thread when execution of the thread was halted on the source machine and the error number associated with the thread.

16. A computer program product for mobility of versioned workload partitions, the computer program product comprising:
    a non-transitory computer readable storage medium having computer usable program code embodied therewith, the computer readable program code configured to,
    determine, at a source machine associated with a global operating system, that a workload partition associated with a first version of an operating system is to be migrated from the source machine to a destination machine, wherein the first version of the operating system is an earlier version than the global operating system;
    halt execution of one or more threads associated with a process executing within the workload partition to be migrated from the source machine to the destination machine;
    for each of the one or more threads associated with the process executing within the workload partition,
    receive an error number associated with the thread in response to the computer readable program code halting the execution of the thread;
    determine at least a current state of the thread as checkpoint information associated with the thread based, at least in part, on the error number associated with the thread; and
    provide the checkpoint information associated with each of the one or more threads associated with the process executing within the workload partition to the destination machine to migrate the workload partition from the source machine to the destination machine.

17. The computer program product of claim 16, wherein the computer readable program code configured to determine at least the current state of the thread as checkpoint information associated with each of the one or more threads associated with the process executing within the workload partition comprises the computer readable program code configured to:
    determine, from a kernel of the global operating system at the source machine, a memory address that references process-specific data for a process executing within the workload partition to be migrated from the source machine to the destination machine;
    for each of one or more threads associated with the process executing within the workload partition,
        based on the memory address that references the process-specific data of the process, determine whether the error number associated with the thread indicates that a system call generated by the thread was interrupted during execution of the system call by the kernel of the global operating system, wherein the memory address references a definition for the error number associated with the thread;
        determine the current state of the thread and the error number associated with the thread as the checkpoint information associated with the thread in response to the computer readable program code determining that the error number associated with the thread indicates that a system call generated by the thread was interrupted during execution of the system call by the kernel of the global operating system; and
        determine the current state of the thread in response to the computer readable program code determining that the error number associated with the thread does not indicate that the system call generated by the thread was interrupted during execution of the system call by the kernel of the global operating system.

18. The computer program product of claim 17, wherein the computer readable program code configured to determine the memory address that references the process-specific data for the process executing within the workload partition to be migrated from the source machine to the destination machine comprises the computer readable program code configured to:
    generate a request, to the kernel of the global operating system, for the memory address that references the process-specific data for the process executing within the workload partition to be migrated from the source machine to the destination machine; and
    receive the memory address that references the process-specific data for the process executing within the workload partition.

19. A machine comprising:
    a processor;
    a network interface coupled with the processor; and
    a checkpoint unit coupled with the process and with the network interface, the checkpoint unit operable to:
        determine, at the machine associated with a global operating system, that a workload partition associated with a first version of an operating system is to be migrated from the machine to a destination machine, wherein the first version of the operating system is an earlier version than the global operating system;
        halt execution of one or more threads associated with a process executing within the workload partition to be migrated from the source machine to the destination machine;
        for each of one or more threads associated with the process executing within the workload partition,
            receive an error number associated with the thread in response to the checkpoint unit halting the execution of the thread;
            determine at least a current state of the thread as checkpoint information associated with the thread based, at least in part, on the error number associated with the thread; and
        provide the checkpoint information associated with each of the one or more threads associated with the process executing within the workload partition to the destination machine to migrate the workload partition from the source machine to the destination machine.

20. The machine of claim 19, wherein the checkpoint unit operable to determine at least the current state of the thread as checkpoint information associated with each of the one or more threads associated with the process executing within the workload partition based on the memory address that references the process-specific data for the process and the error number associated with the thread comprises the checkpoint unit operable to:
    determine, from a kernel of the global operating system, a memory address that references process-specific data for a process executing within the workload partition to be migrated from the machine to the destination machine
    for each of one or more threads associated with the process executing within the workload partition,
        based on the memory address that references the process-specific data of the process, determine whether the error number associated with the thread indicates that a system call generated by the thread was interrupted during execution of the system call by the kernel of the global operating system, wherein the memory address references a definition for the error number associated with the thread;

determine the current state of the thread and the error number associated with the thread as the checkpoint information associated with the thread in response to the checkpoint unit determining that the error number associated with the thread indicates that a system call generated by the thread was interrupted during execution of the system call by the kernel of the global operating system; and determine the current state of the thread in response to the checkpoint unit determining that the error number associated with the thread does not indicate that the system call generated by the thread was interrupted during execution of the system call by the kernel of the global operating system.

\* \* \* \* \*